United States Patent [19]

Bateman et al.

[11] Patent Number: 5,276,797
[45] Date of Patent: Jan. 4, 1994

[54] DYNAMICALLY EXTENDING SELECTION CHOICES

[75] Inventors: Rhonald M. Bateman, Carrollton; Richard E. Berry, Georgetown; Ronald J. Lisle, Cedar Park; Charles A. Schafer, Austin, all of Tex.

[73] Assignee: International Business Machine Corporation, Armonk, N.Y.

[21] Appl. No.: 708,078

[22] Filed: May 24, 1991

Related U.S. Application Data

[63] Continuation of Ser. No. 176,476, Mar. 31, 1988, abandoned.

[51] Int. Cl.$^5$ .................... G06F 15/00; G09G 1/00
[52] U.S. Cl. .................... 395/161; 395/155; 345/145; 345/157
[58] Field of Search .............. 364/518, 521, ; 340/706, 747, 750; 395/155, 156, 157, 161

[56] References Cited

U.S. PATENT DOCUMENTS

| | | | |
|---|---|---|---|
| 4,559,615 | 12/1985 | Goo et al. | 364/900 |
| 4,611,306 | 9/1986 | Crehan et al. | 364/900 |
| 4,646,250 | 2/1987 | Childress | 364/518 |
| 4,663,731 | 5/1987 | Ikegami et al. | 364/900 |
| 4,698,624 | 10/1987 | Barker et al. | 340/709 |
| 4,812,828 | 3/1989 | Nishi et al. | 340/706 |
| 4,899,136 | 2/1990 | Beard et al. | 340/706 |
| 4,975,690 | 12/1990 | Torres | 340/< |
| 4,999,790 | 3/1991 | Murayama et al. | 364/521 |

OTHER PUBLICATIONS

Apple Computer Inc. "Macintosh", 1983, pp. 53-75.
Mayers A. Brad "Window Interfaces-A Taxonomy of Window Manager User Interfaces" IEEE CG&A Sep. 1988 pp. 65-84.
IBM *DisplayWrite 1 User's Guide*, IBM Corporation, 1984, pp. 4-2, 4-3.
"Fileman" User Document, IBM Corporation, IBM Internal Publication, pp. 8-11 (undated but an earlier version of this program existed prior to filing).

*Primary Examiner*—Phu K. Nguyen
*Attorney, Agent, or Firm*—Douglas H. Lefeve; Mark E. McBurney

[57] ABSTRACT

An extended selection field for use in selecting one or more choices from a list on an information system display. The extended selection field exhibits the behavior and appearance of a standard single choice field, with the additional capability to switch into a multiple choice mode to override the single choice restriction. A single choice is selected using the standard technique of moving the selection bar to the desired choice and pressing the Enter key. However, the single choice restriction may be overridden by using the standard multiple choice selection technique of moving the selection bar to a first desired choice and pressing (instead of the Enter key) a choice selection key such as the space bar. The field then exhibits the behavior and appearance of a standard multiple choice field. The single choice selection bar immediately changes to a multiple choice indicator and the operator receives immediate visual feedback that the system is enabled to accept multiple choices. At the conclusion of the multiple choices, the Enter key is depressed to submit all of the selected choices for processing. The single choice mode can be reestablished by deselecting all of the selected choices.

24 Claims, 6 Drawing Sheets

```
✓ Abernathy, C. D.
  Boxsworth, M. L.
✓ Chatswell, D. M.
  Dillingham, W. E.
✓ Edwards, L. A.
  Fleming, M. P.
```

DYNAMICALLY EXTENDING SELECTION CHOICES

This is a continuation of application Ser. No. 07/176,476 filed Mar. 31, 1988, now abandoned.

TECHNICAL FIELD

This invention relates to data processing systems in general and more particularly to a data processing system in which an operator is presented with a list of items from which to choose one or multiple ones of the items for an action to be performed thereon.

BACKGROUND ART

Many computer programs exist in which an operator is presented with a list of items from which to choose one or multiple ones of the items for an action to be performed thereon. Such programs have become popular because human factors studies have shown that it is easier for users to recognize and select desired items from a list on the display screen, rather than having to remember the items (or make reference to another list) and type them. For example, consider the many programs available for maintaining the organization of program and data files on the hard disk of a personal computer. Such programs exist which allow an operator to mark one or more files to be, for example, copied, erased, or moved to another directory, disk or diskette. Alternatively, instead of choosing one or more files on which an action is to be taken, the operator may be presented with a list of actions to be performed on one or more files.

It is a common practice to allow an operator to select a desired choice in a list of choices by moving a highlight bar to the choice (with the aid of cursor direction keys or a pointing device such as a mouse) and pressing a keyboard key or mouse button to enter the choice. In programs in which only one choice at a time may be made, the selected choice may be submitted immediately to the system for processing, since no other choices are allowed. In programs in which a plurality of choices are allowed before processing of the choices takes place, the first selection cannot be immediately submitted because the user may need to make additional selections before submitting the field.

Accordingly, these two types of selection fields—the single choice field and multiple choice fields—have been mutually exclusive. While it is immediately obvious that multiple choices are not allowed when only a single choice is permitted, it must also be understood that where multiple choices are permitted, systems have been unable to recognize a single choice as being the only choice intended, since additional choices were allowed.

The single choice selection field provides better ease-of-use characteristics, because the choice is submitted to the system for processing just as soon as the choice is made. The operator does not sit and wonder if other necessary actions have been completed, because processing with the single choice can be undertaken as soon as the choice has been made, since only one choice is allowed. There are many applications in which selection of one choice at a time will be most typical, with only a occasional need for the selection of multiple choices. For example, consider a list of file names wherein the operator can select the name of a file and an action to be performed on it, such as "Erase". The typical situation will require erasing a single file. However there are also situations in which it is desirable to select several file names and request "Erase" for all of the files at once. The novice and casual users need the benefits of single choice field characteristics, while the more experienced user desires the capabilities of multiple choice fields.

As an example the IBM DisplayWrite 1 program allows a directory of files to be listed. The user may pick one of several choices of actions to be performed on a single file. Assume then that the user chooses "Erase" and moves the movable bar up or down the list of files and stops this movable bar on a file intended to be erased. When the Enter key is depressed the action to erase this chosen file begins. As another example consider a file manager program in which multiple files may be chosen for erasure. If the operator depresses the Enter key after choosing only one file (following the procedure of the DisplayWrite 1 program) the erasure process does not begin. Instead, the operator is prompted to use the space bar to select the files to be erased and then to depress the Enter key at the completion of selecting all of the choices. The operator is, therefore, not allowed to use the intuitively obvious technique of processing the single choice as is employed in the program which allows only single choices.

It would, therefore be of great benefit and utility to provide the ability within one program or system to make multiple choice selections while simultaneously allowing a single choice to be as immediately processed as in programs or systems which allow only single selections.

SUMMARY OF THE INVENTION

Accordingly, the ease of use of the single choice selection field is combined with the additional capability of the multiple choice selection field by use of an extended selection field which exhibits the behavior of a single choice field, to the benefit of novice and casual users, but allows the more experienced user to override the single choice restriction. Extended selection fields initially appear as single choice fields, for example, with a highlighted, color or reverse video, selection bar on one of the choices. In addition, the selection bar in a list in which extended selection is provided also has the appearance of allowing multiple choices by having, for example, an outline box around the selection bar. A single choice is selected using the normal technique of moving the selection bar to the desired choice and pressing a function key such as the Enter key. However, the more experienced user can override the single choice restriction by moving the selection bar to a first desired choice and pressing (instead of the Enter key) a choice selection key such as the alphanumeric space bar or slash mark. The single choice selection bar immediately changes to a multiple choice indicator and the operator receives immediate visual feedback that the system is enabled to accept multiple choices. At the conclusion of the multiple choices, the Enter key is depressed to submit all of the selected choices for processing.

The foregoing and other objects, features, extensions, and advantages of the invention will be apparent from the following more particular description of preferred embodiments of the invention as illustrated in the accompanying drawings.

BRIEF DESCRIPTION OF DRAWING

FIG. 2 shows a list of selections and a movable, reverse video selection bar overlying one of the selections.

FIG. 3 shows a list of selections in which multiple choices are possible, as indicated by the check mark adjacent two of the selections.

FIG. 4 shows a list of selections and a movable selection bar which indicates to an operator the extended selection field capability of this invention.

FIG. 5 shows the list of selections of FIG. 4 after the operator has invoked the multiple choice selection option of the extended selection field capability of this invention.

FIG. 6 shows the list of selections of FIG. 4 after the operator has made three choices using the multiple choice selection option of the extended selection field capability of this invention.

DESCRIPTION OF THE PREFERRED EMBODIMENTS

Figure 1:
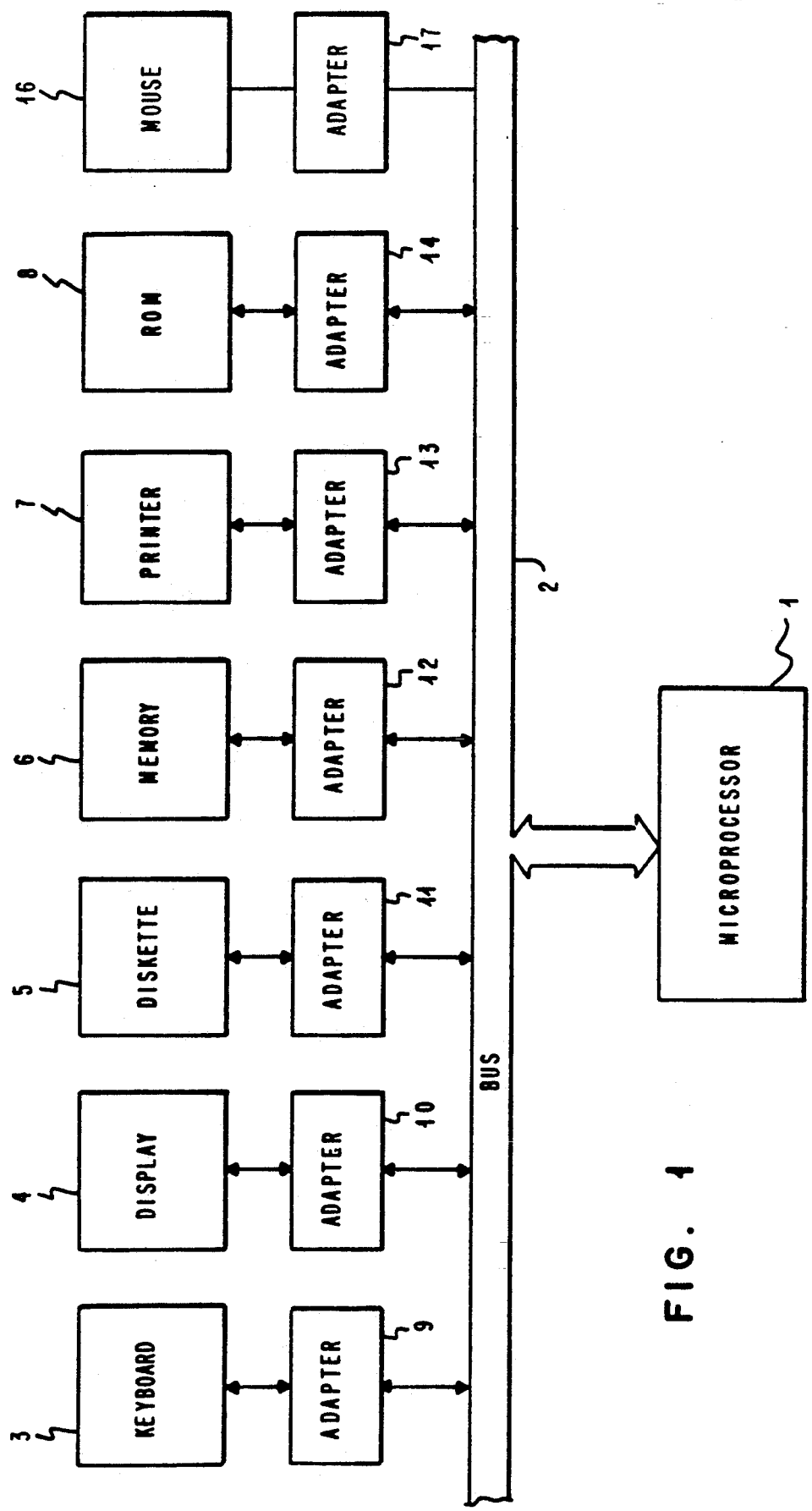
FIG. 1 is a block diagram of a data processing system which includes a stored program for performing the function of this invention in conjunction with the data processing system.

Beginning with reference to the block diagram of FIG. 1, a typical personal computer architecture is shown, such as the configuration used in the IBM Personal Computer. The focal point of this architecture comprises a microprocessor 1 which may, for example, be an Intel 80286 or similar microprocessor. The microprocessor 1 is connected to a bus 2 which comprises a set of data lines, a set of address lines and a set of control lines. A plurality of I/O devices or memory or storage devices 3-8 and 16 are connected to the bus 2 through separate adapters 9-14 and 17, respectively. For example, the display 4 may be the IBM Personal Computer Color Display and the adapter 10 may, accordingly, be the IBM Color/Graphics Adapter. The other devices 3 and 5-8 and adapters 9 and 11-14 are either included as part of an IBM Personal Computer or are available as plug-in options from the IBM Corporation. The Mouse 16 and adapter 17 are available from the Microsoft Corporation as the Microsoft Mouse, bus version. The random access memory (RAM) 6 and the read-only memory (ROM) 8 and their corresponding adapters 12 and 14 are included as standard equipment in the IBM Personal Computer, although additional random access memory to supplement memory 6 may be added via a plug-in memory expansion option.

Within the read-only memory 8 are stored a plurality of instructions, known as the basic input/output operating system, or BIOS, for execution by the microprocessor 1. The BIOS controls the fundamental operations of the computer. An operating system such as the IBM Personal Computer Series Disk Operating System by Microsoft Corporation, or DOS, most commonly used with the IBM Personal Computer family, is loaded into the memory 6 and runs in conjunction with the BIOS stored in the ROM 8. It will be understood by those skilled in the art that the personal computer system could be configured so that parts or all of the BIOS are stored in the memory 6 rather than in the ROM 8 so as to allow modifications to the basic system operations by changes made to the BIOS program, which would then be readily loadable into the random access memory 6.

An application program such as the aforementioned IBM DisplayWrite 1 word processing program may also be loaded into the memory 6 to provide instructions to the microprocessor 1 to enable a comprehensive set of word processing tasks, including the creation and revision of text documents, to be performed by the personal computer system shown in FIG. 1. An application program loaded into the memory 6 is said to run in conjunction with the disk operating system previously loaded into the memory 6.

While the IBM DisplayWrite 1 program is used as an example of the type of program for which the present invention would represent a great enhancement, those skilled in the art will realize that this invention would enhance a wide variety of types of application programs. Those skilled in the art will also recognize that, although the aforementioned hardware system is well known in the art this invention comprises the combination of a hardware system which is configured or programmed according to the teaching of this invention, as described in detail below.

Figures 2, 3, 4:
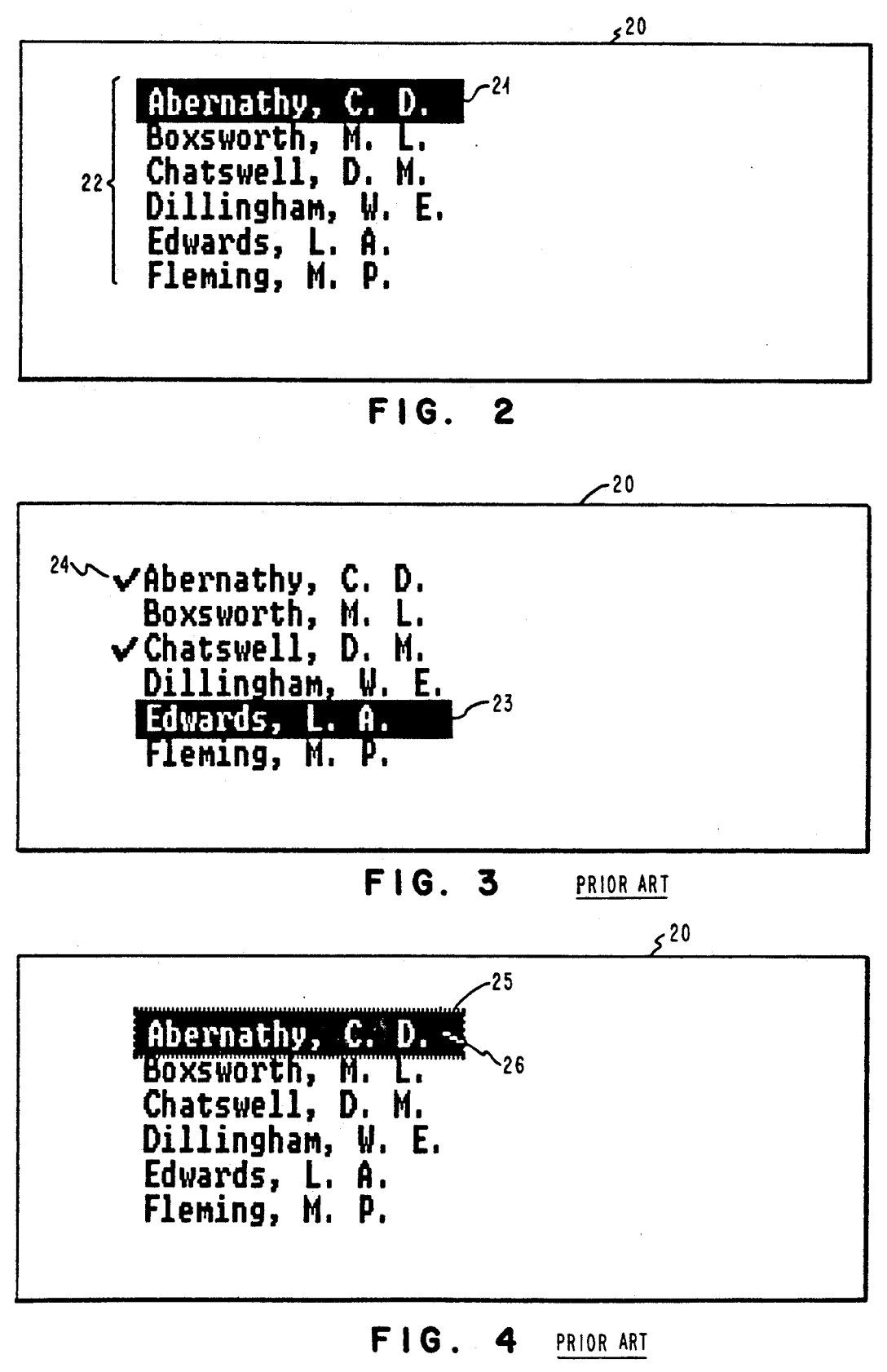

Referring now to FIG. 2, a common technique for selecting one from a list of choices presented on a screen 20 of a visual display device uses a movable reverse video bar 21 hereafter called the selection cursor. The selection cursor is moved over the list of choices 22 using cursor direction keys such as Up Arrow and Down Arrow keys on a computer keyboard. When the selection cursor is on the desired choice the user signals the computer by pressing another key such as an Enter key.

A benefit of this technique is that it is very easy for novice computer users to learn and use. A disadvantage is that it allows a single choice at a time to be made, although the user may wish to repeat the same processing on more than one item in the list. Users frequently need to be able to select more than one choice at a time.

FIG. 3 shows a common technique for selecting several items from a list of choices. This technique uses a selection cursor 23 identical in appearance to the selection cursor 21 FIG. 2. The selection cursor 23 is moved over the list of choices using cursor direction keys. When the cursor is on a desired choice a selection key such as the space bar is pressed. An indication such as a check mark 24 is displayed beside the selected choice. These steps can be repeated until all desired choices have been selected. Pressing the space bar with the selection cursor on a choice that is already selected results in the choice's becoming deselected and the disappearance of the check mark. Thus, the selection process toggles the state of each choice from deselected to selected and back to to deselected if the toggling is continued. After all desired choices have been selected the user signals the computer to submit the choices to processing by pressing another key such as an Enter key.

A benefit of this FIG. 3 technique is that it allows multiple choices to be selected and conveyed to the computer for processing collectively. Disadvantages are that the user must learn an additional and different technique from the one used for single choice lists, and there is no visual cue as to whether the list allows one or more choices to be selected.

The present invention provides the benefits of both single and multiple choice fields and provides visual cues to the user. The invention consists of a modal list of choices, two forms of the selection cursor, and a technique for switching between the two modes of single choice selections and multiple choice selections. Referring now to FIG. 4, in its initial mode the list is used in a single choice mode. Note that the appearance and behavior of the selection cursor is almost identical to that of the selection cursor 21 in FIG. 2. The selection cursor appears as an outline box 25 surrounding a reverse video bar 26. This appearance is a visual cue that extended selection is possible, thereby providing the user with the options of treating the selection cursor as identifying a single choice field or one of a plurality of multiple choices.

Figures 5, 6:
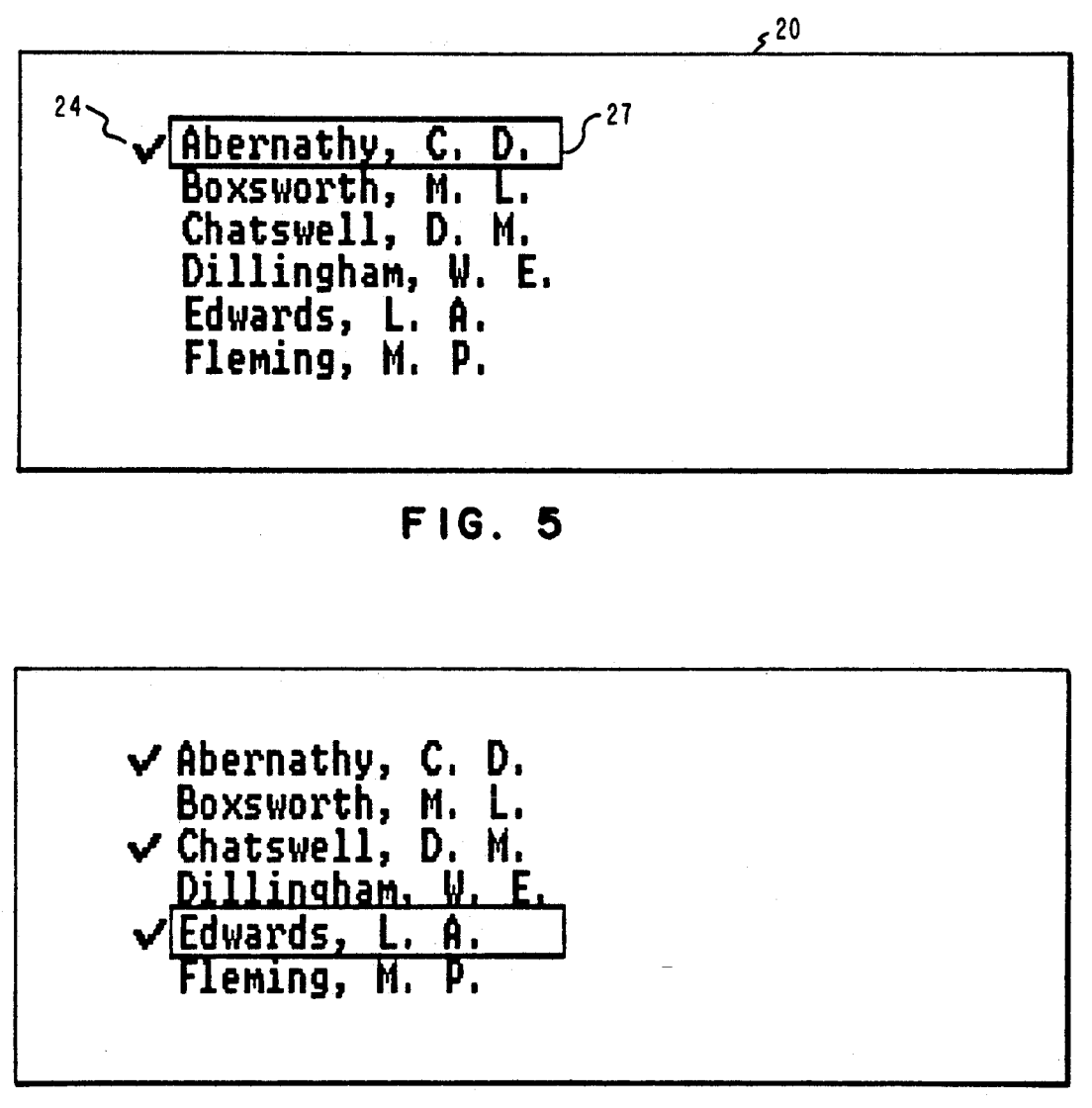

With the options indicated by FIG. 4, the user can move the selection bar up and down the list and treat the list as a single choice list, for example, by pressing the Enter key or clicking the mouse on a single choice for causing an action to be immediately taken relative to the single, selected name on the list. If, instead of pressing the Enter key, the user presses the space bar, the field switches into multiple choice mode. The selection cursor changes appearance, such as to an outline box 27 in FIG. 5, and a selected indication such as a check mark 24 appears beside the selected choice. The user may move the outline box cursor to other choices and press the space bar to select more than one choice, as depicted in FIG. 6. Pressing the space bar with the selection cursor on a choice that is already selected results in the choice's becoming deselected and the disappearance of the check mark. After all desired choices have been selected the user signals the computer by pressing another key such as an Enter key. If the user deselects all of the selected choices prior to pressing Enter, the field reverts to a single choice mode as depicted in FIG. 4.

The advantage of this invention is that it provides visual cues to the modes of operation available (e.g., single choice and multiple choice) and uses standard single choice and multiple selection techniques. Thus, novice users can continue to use the simple single choice technique while more experienced users can take advantage of more concurrent processing with the multiple choice mode.

In practice, the appearances of the selection cursor are chosen to be consistent across the three types of lists: single choice, multiple choice, and extended choice. For example, in single choice it is a reverse video bar or it may be a color bar. In multiple choice it is an outline box. In extended choice it starts as an outline box surrounding a reverse video or color bar in single choice mode and changes to only an outline box in multiple choice mode. Thus the appearance of the selection cursor provides a consistent visual cue as to the type of list and how many choices may be selected.

Figure 7:
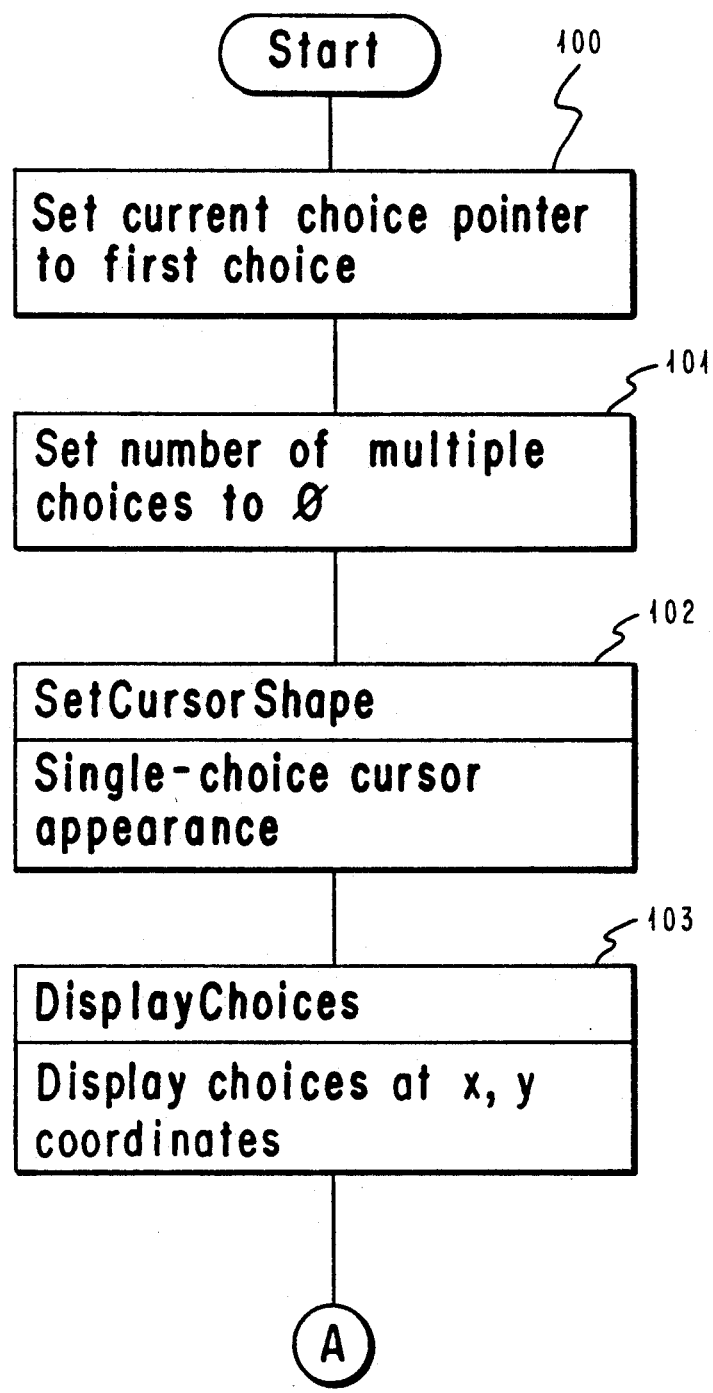
FIGS. 7-9 are flow charts of the logical operations performed in the operation of the preferred embodiment of this invention.

Refer now to the flowchart depicted in FIG. 7 for a description of the logical operations which are executed by a computer or logically driven system in carrying out this invention.

In FIG. 7 at 100 a program variable is set to indicate that the first item on the list (such as the list of choices 22 in FIG. 2) will be the item on which the cursor is to be initially located. At 101 the number of multiple choices is initialized to zero, since the operation begins in a single choice mode. At 102 the initial cursor appearance is established as a single choice selection cursor capable of extended selection, as in the selection cursor shown in FIG. 4. At 103 the list of choices is displayed.

The result of these subroutine calls is depicted in FIG. 4. The operation then continues at "A" in FIG. 8.

Figure 8:
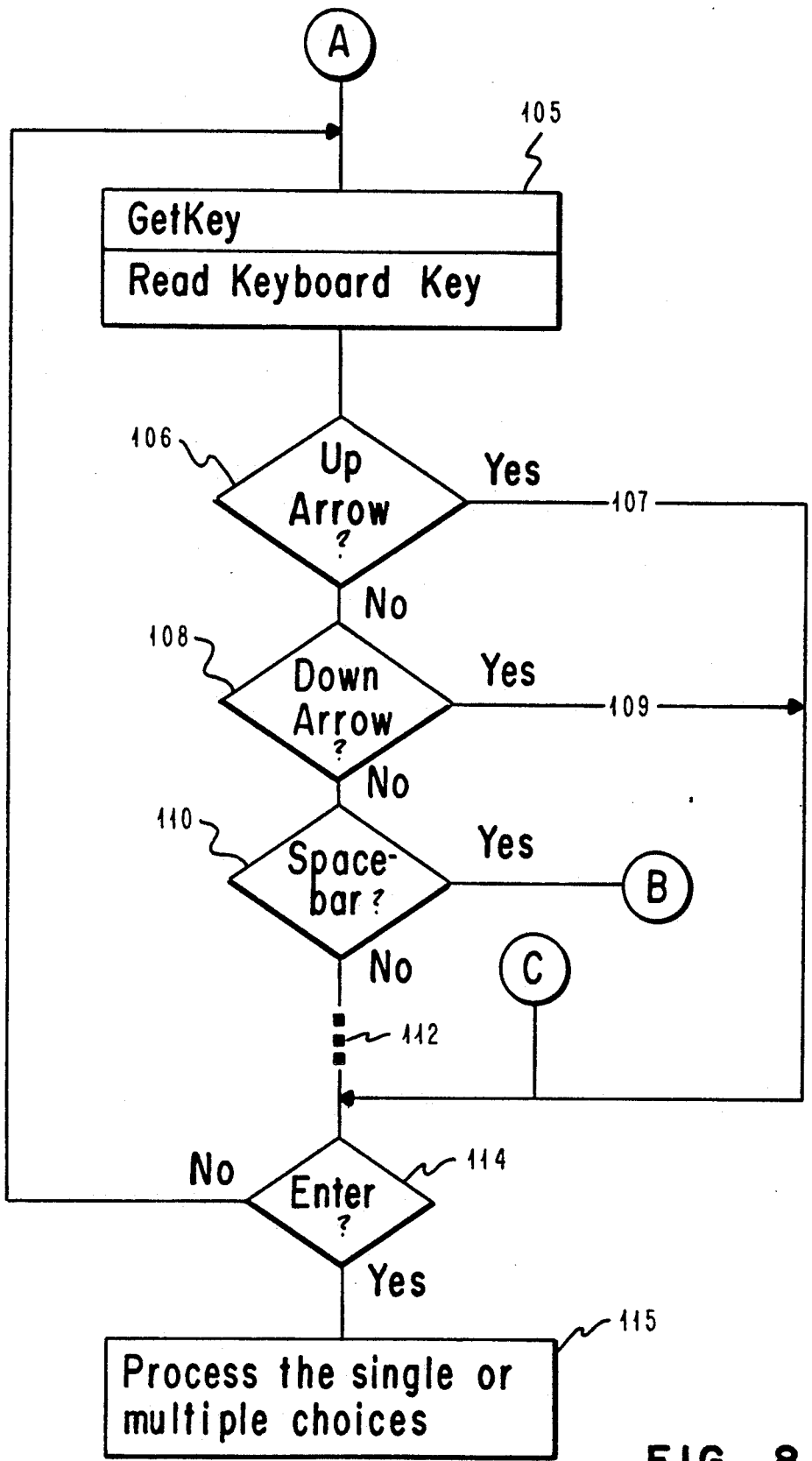

Referring now to FIG. 8, at 105 a key is read from the keyboard. At 106, 108, and 110 the key is tested to determine if the key is an up arrow, down arrow or space bar. If the depressed key is an up arrow a branch is taken at 106 to move the selection cursor upwardly at 107 and thence to 114 as will be described below. Similarly, if the pressed key is a down arrow a branch is taken at 108 to move the selection cursor downwardly at 109 and thence to 114. The purpose of these cursor direction actions is to move the selection cursor from the current choice to the next choice in the direction indicated by the depressed key.

At 110 a test is made for the space bar. The space bar key is an example of a key that may be used in making multiple choice selections. The space bar is but one example of the keys that may be used in making multiple choice selections and those skilled in the art will recognize that the use of this key is not critical to the invention. Any key not already used for another purpose would suffice. If the pressed key is not the space bar the program may continue to test for other keys, not relevant to the invention, at 112. If the depressed key is the space bar the operation continues to "B" in FIG. 9.

Figure 9:
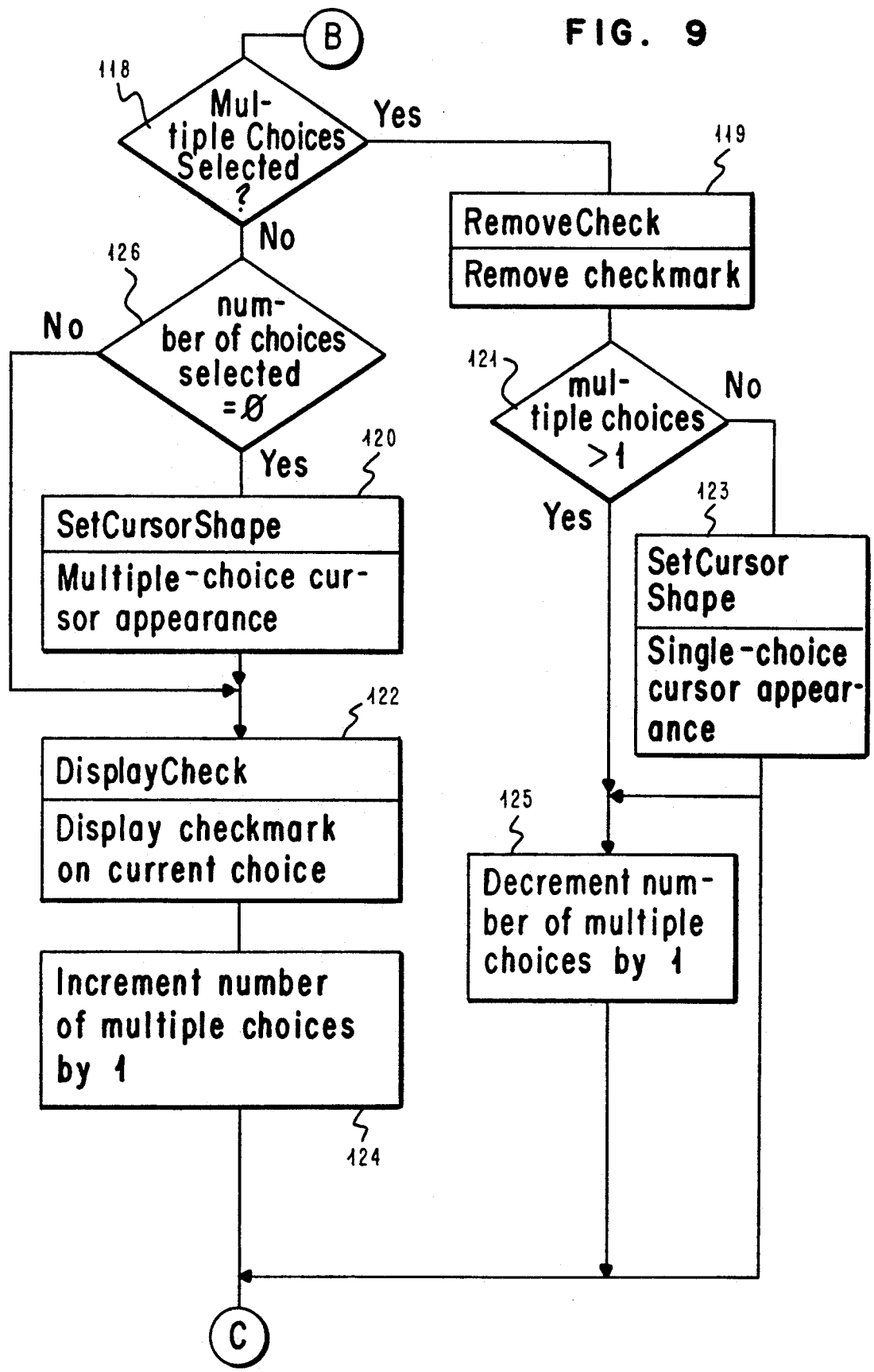

With reference to FIG. 9, at 118 a test is made to determine if the choice associated with the selection cursor has been selected. If not, at 126 a test is made to determine if the number of choices selected is equal to zero. If so, at 120 the multiple choice cursor appearance is set and at 122 a check mark is displayed beside the selected choice. The appearance is now as shown in FIG. 5. At 124 a program variable indicating the number of multiple choices is incremented by one. If, at 126 the number of choices selected is not equal to zero, the action at 120 is skipped and a check mark is displayed in association with the current choice.

If at 118 the current choice is already selected, then the operation continues to 119 wherein the check mark beside the selected choice is removed. At 121 a test is made to determine if the number of multiple choices is greater than one. If so, at 125 the number of multiple choices is decremented by one. Otherwise, only one choice is selected and at 123 the cursor's appearance is changed back to single choice appearance as shown at the top of the list in FIG. 4. Following this cursor appearance change, the number of multiple choices is decremented by one, at 125 (which makes the number of multiple choices now zero).

The operation then returns to "C" in FIG. 8. At 114 a test is made for the Enter key (or other key that indicates completion of choice selection). If the depressed key is not the Enter key the operation reverts back to 105 and another key is read from the keyboard. If the pressed key is Enter processing of the selected choices takes place at 115.

The following programming design language listing is another form of the description of the above described logical operations performed for dynamically extending selection choices. This listing parallels the operation described above for FIGS. 7-9.

```
CurrentChoice: = 1;
MultipleChoices: = 0;
SetCursorShape (SingleChoice);
DisplayChoices (ChoiceList,XCoordinate,YCoordinate);
Repeat
    GetKey (KeyChar);
```

-continued

```
Case KeyChar of
    UpArrow: MoveCursorUp;      {moves cursor up and}
                                {decrements current choice}
    DownArrow:                  {moves cursor down and}
    MoveCursorDown;             {increments current choice}
    SpaceBar: Begin
        If IsSelected (CurrentChoice) = 0 then
            Begin
            If MultipleChoices = 0 then
                SetCursorShape (MultipleChoice);
            DisplayCheck (CurrentChoice);
            MultipleChoices:=MultipleChoices+1;
            End;
        Else
            RemoveCheck (CurrentChoice);
            If MultipleChoices >1 then
                SetCursorShape (SingleChoice);
            MultipleChoices:=MultipleChoices-1;
            End;
    End;
Until Key=Enter;
{process selections}
```

In summary, a technique has been shown in which the ease of use of the single choice selection field is combined with the additional capability of the multiple choice selection field by use of an extended selection field which exhibits the behavior of a single choice field, but also allows the more experienced user to override the single choice restriction. Extended selection fields initially appear as single choice fields, for example, with a high-lighted, color or reverse video, selection cursor bar on one of the choices. In addition, the selection cursor in a list in which extended selection is provided also has the appearance of allowing multiple choices by having, for example, an outline box around the selection cursor. A single choice is selected using the standard single choice technique of moving the selection cursor to the desired choice and pressing the Enter key. However, the user can override the single choice restriction by moving the selection cursor to a first desired choice and, using the standard multiple choice technique, pressing (instead of the Enter key) a choice selection key such as the space bar. The single choice selection cursor immediately changes to the standard multiple choice indicator and the operator receives immediate visual feedback that the system is enabled to accept multiple choices. At the conclusion of the multiple choices, the Enter key is depressed to submit all of the selected choices for processing.

While the invention has been shown and described with reference to particular embodiments thereof, it will be understood by those skilled in the art that the foregoing and other changes in form and details may be made therein without departing from the spirit and scope of the invention.

We claim:

1. A method of providing operator selection of one or more items in a list of items displayed to an operator on a computer system having a display and an input device comprising:

displaying a selection cursor identifying one of said items and having a first appearance indicating an extended selection field that allows the operator to select said items in at least two different selection modes including a single choice mode and a multiple choice mode;

operating said system, with said selection cursor having said first appearance in said single choice mode in response to an entry input from said input device; and displaying said selection cursor with a second appearance indicating a change of system operation to said multiple choice mode in response to a selection input from said input device.

2. The method of claim 1 wherein said selection input marks said one of said items as an operator selection in addition to causing said change of system operation to said multiple choice mode.

3. The method of claim 2 further comprising continuing system operation in said multiple choice mode in response to repeated selection inputs from said input device.

4. The method of claim 2 further comprising processing the first of one or more operator selected items on said list in response to a last selection input followed by an entry input from said input device.

5. The method of claim 4 wherein said input device is a keyboard.

6. The method of claim 5 wherein said entry input is the operator depression of a function key on said keyboard.

7. The method of claim 6 wherein said function key on said keyboard is an Enter key.

8. The method of claim 5 wherein said selection input is the operator depression of an alphanumeric key on said keyboard.

9. The method of claim 8 wherein said alphanumeric key is a space bar on said keyboard.

10. The method of claim 4 wherein said input device is a pointing device.

11. The method of claim 10 wherein said pointing device is a mouse.

12. The method of claim 11 wherein said entry and selection inputs are operator depressions of one or more buttons on said mouse.

13. The method of claim 1 wherein said first appearance comprises a shaded bar superimposed over said one of said items.

14. The method of claim 13 wherein said shaded bar is a reverse video bar.

15. The method of claim 13 wherein shaded bar is a color bar.

16. The method of claim 13 wherein said second appearance comprises an outline box surrounding said one of said items.

17. A method of providing operator selection of one or more items in a list of items displayed to an operator on a computer system having a display and an input device comprising:

displaying a list of items to said operator from which one or more of the items are to be selected by said operator for processing;

displaying an input device movable, selection cursor identifying one of said items and having a first visual characteristic indicating an extended selection field that allows the operator to select said items in at least two different selection modes including a single choice mode and a multiple choice mode;

immediately responding in said single choice mode to an entry input from said input device, which entry input occurs in the absence of a preceding choice selection input, by causing immediate processing of a single operator selected item in said list identified by said selection cursor having said first visual characteristic;

displaying a selection cursor having a second visual characteristic responsive to said choice selection input from said input device, said second visual characteristic indicating said multiple choice mode; and responding in said multiple choice mode to an entry input from said input device, which entry input succeeds said choice selection input, by causing immediate processing of the first of one or more operator selected items in said list, each of said items having been operator selected by making one or more choice selection inputs with said input device.

18. A system for providing operator selection of one or more items in a list of items displayed to an operator on a computer system having a display and an input device comprising:

means for displaying a selection cursor identifying one of said items and having a first appearance indicating an extended selection field that allows the operator to select said items in at least two different selection modes including a single choice mode and a multiple choice mode;

means for operating said system in said single choice mode, with said selection cursor having said first appearance, in response to an entry input from said input device; and means for displaying said selection cursor with a second appearance indicating a change of system operation to said multiple choice mode in response to a selection input from said input device.

19. The system of claim 18 further comprising means for continuing system operation in said multiple choice mode in response to repeated selection inputs from said input device.

20. The system of claim 19 further comprising means for processing the first of one or more operator selected items on said list in response to a last selection input followed by an entry input from said input device.

21. The system of claim 20 wherein said input device is a keyboard.

22. The system of claim 20 wherein said input device is a mouse.

23. The system of claim 20 wherein said first appearance comprises a shaded bar which overlies said one of said items.

24. The system of claim 20 wherein said second appearance comprises an outline box surrounding said one of said items.

* * * * *